United States Patent [19]

Takata

[11] 4,274,658
[45] Jun. 23, 1981

[54] VEHICLE OCCUPANT RESTRAINT SYSTEM

[76] Inventor: Juichiro Takata, 3-12-1, Shinmachi Setagayaku, Tokyo, Japan

[21] Appl. No.: 51,969

[22] Filed: Jun. 25, 1979

[51] Int. Cl.³ .............................................. B60R 21/10
[52] U.S. Cl. .................................... 280/804; 280/803; 297/469
[58] Field of Search ............... 280/804, 803, 802, 808; 297/469, 483

[56] References Cited

U.S. PATENT DOCUMENTS

| | | | |
|---|---|---|---|
| 3,831,974 | 8/1974 | Keppel | 280/804 |
| 3,842,929 | 10/1974 | Wada et al. | 280/804 |
| 3,933,369 | 1/1976 | Kaneko et al. | 280/803 |
| 4,175,773 | 11/1979 | Miller | 280/803 |
| 4,190,266 | 2/1980 | Cachia | 280/802 |

Primary Examiner—Randolph A. Reese
Assistant Examiner—Donn McGiehan
Attorney, Agent, or Firm—Brumbaugh, Graves, Donohue & Raymond

[57] ABSTRACT

A vehicle occupant restraint system for restraining an occupant of a seat located adjacent a door that is hinged along the front edge comprises a shoulder belt having one end secured to an anchor affixed to the upper rear portion of the door, a portion that extends down and in across the seat and an inboard portion that is wound on to an emergency locking retractor. An elongated guide rail extending along the edge of the roof generally coextensively with the upper edge of the door receives a slider for sliding movement therealong. A belt guide ring is movably attached to the slider and receives the intermediate portion of the belt for movement therethrough. The system may also comprise a lap belt having its inboard end secured to the intermediate portion of the shoulder belt and its outboard end wound on to an emergency locking retractor affixed adjacent the lower rear corner of the door.

7 Claims, 6 Drawing Figures

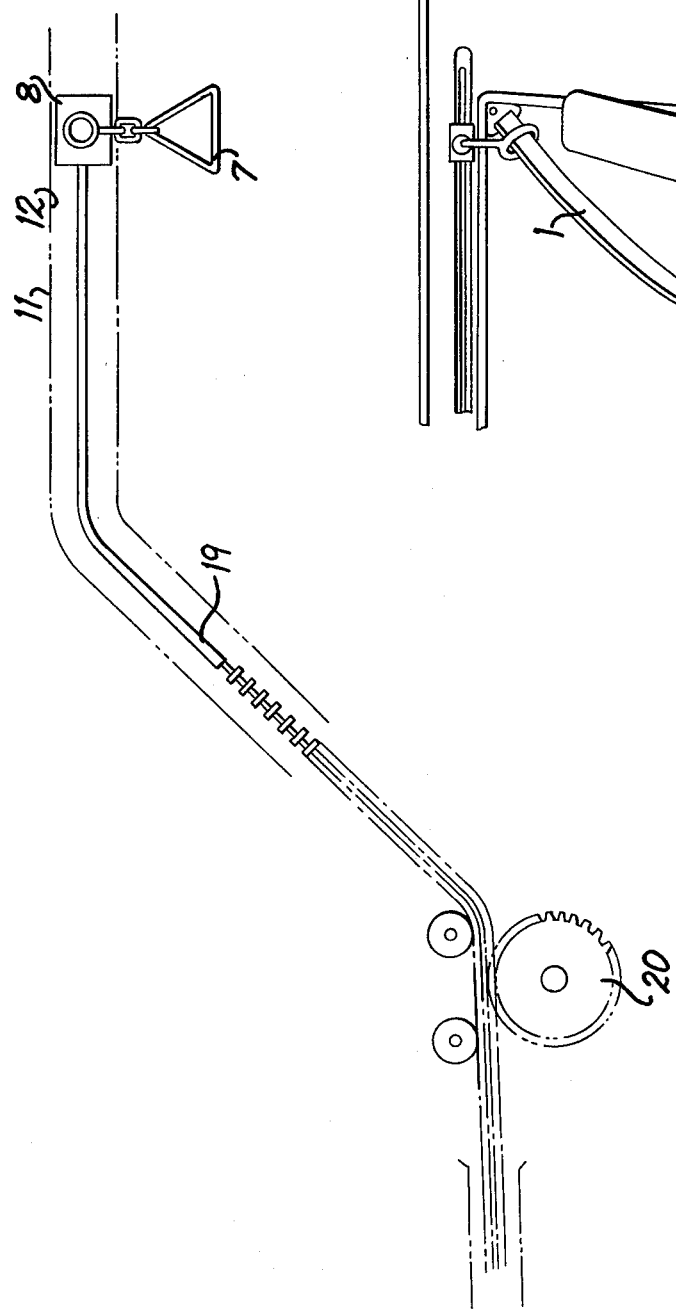
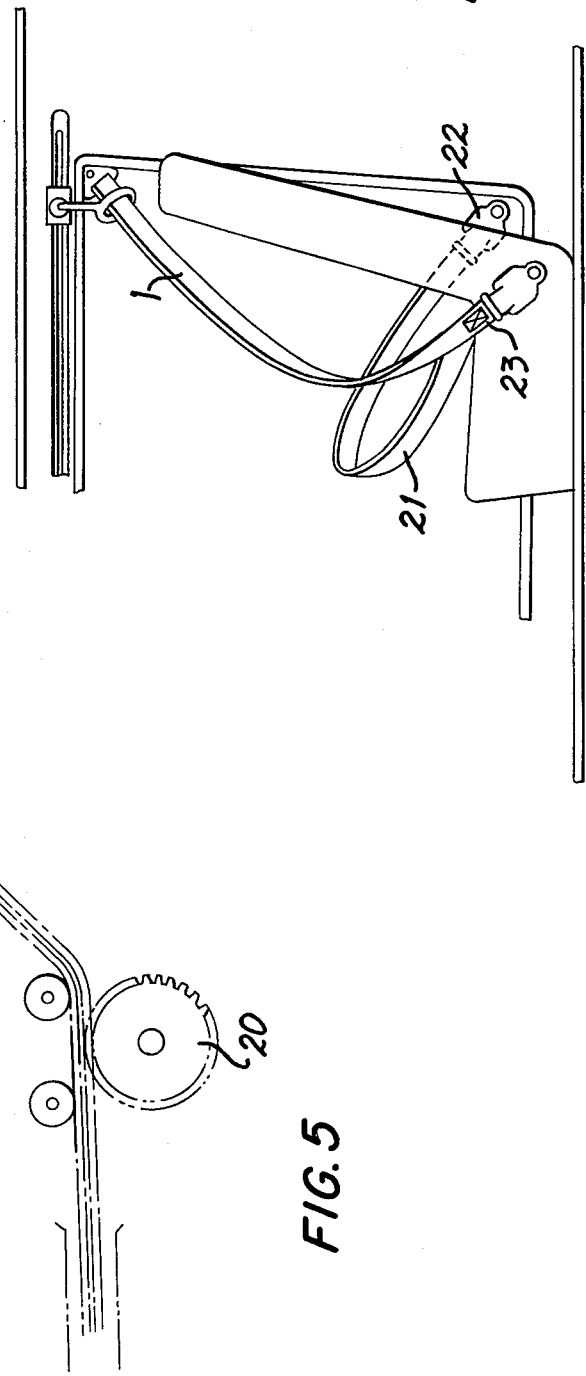
FIG. 5
FIG. 6

VEHICLE OCCUPANT RESTRAINT SYSTEM

FIELD OF THE INVENTION

This invention relates to a vehicle occupant restraint system of the type which includes a shoulder belt having an outboard end secured to an anchor affixed at the upper rear portion of the door and an inboard end which is wound on to a retractor affixed adjacent the inboard lower rear portion of the vehicle seat.

BACKGROUND OF THE INVENTION

In recent years there have been a number of proposals for vehicle occupant restraint systems which include a shoulder belt leading from a retractor located generally at the center of the vehicle adjacent the lower rear portion of the seat upwardly and outwardly to an anchor affixed to the upper rear portion of the vehicle door. When the door is opened, the belt is pulled from the retractor, and because the rear of the door moves forwardly as well as outwardly, the shoulder belt is moved some distance forward from the restraint configuration. That forward movement releases an occupant from restraint and permits him or her to leave the vehicle, or if he or she is not in the vehicle, permits him or her to enter the vehicle. However, the amount of forward movement of the belt is generally inadequate to make it convenient and easy for an occupant to enter or leave the seat and the occupant generally must push the belt out of the way to either enter or leave.

An object of the present invention is to improve such a belt system by increasing the amount of clearance between the occupant and the belt when the door is open, thereby facilitating entry or departure of an occupant to or from the vehicle.

SUMMARY OF THE INVENTION

In particular, there is provided, in accordance with the present invention, a vehicle occupant restraint system for use in connection with a seat located adjacent a door that is hinged along the front edge, by far the most common arrangement used in present-day motor vehicles. The restraint system comprises a shoulder belt, the outboard end of which is secured to an anchor affixed to the upper rear portion of the door. The belt leads from the anchor downwardly and inwardly across the vehicle seat to a point generally at the lower inboard rear of the seat. The inboard end portion of the belt is received by an emergency locking retractor which is mounted on the floor or on the side of the seat inboard of and generally below and behind the occupant position on the seat. An elongated guide rail is mounted on the edge of the roof, extends generally coextensively with the upper edge of the door and may also extend partway down the front post of the door. The guide rail receives a slider which can move forwardly and rearwardly along the guide rail. A belt guide ring is movably attached to the slider and receives an intermediate portion of the belt for movement therethrough.

Among the preferred features of the invention are, for one thing, the mounting of the guide rail on the roof in a manner such that it can rock within a predetermined range about generally the center. In the manner described in more detail below, the rocking of the guide rail facilitates smooth movement of the slider along it. Movement of the slider is further facilitated by coating the surfaces along which the slider rides with a low friction polymeric material, such as polytetrafluorethylene ("Teflon") or polyurethane.

Although the slider may be moved back and forth along the guide rail in response to tension in the belt exerted by the retractor, which pulls the belt into the shortest possible path between the upper corner of the door and the retractor, it is advantageous to secure the slider to a drive wire which, in turn, is coupled to drive means for moving the wire in response to opening and closing motions of the door. The drive device may be a mechanical motion amplifier such as a block and tackle in which at least one block is mounted on the door and another block is mounted on the car body. The drive wire is looped around the pulleys in a manner such that the opening motion of the door is multiplied in the block and tackle and provides amplified movement of the slider. The motion amplifier can also be a mechanical lever system, a gear train and a suitable linkage which transmits door opening motion to the input pinion by means of a link having a rack gear, or a motor-driven gear or pulley controlled by the opening and closing motions of the door through a door actuated switch and limit switches operated by the slider.

In another embodiment of the invention, which may include one or more features described above, the restraint system also includes a lap belt, the outboard portion of which is wound onto an emergency locking retractor affixed to the lower rear corner of the door. The inboard portion is sewn to the shoulder belt at a position such that when the shoulder belt is pulled in the restraining position the inboard end of the lap belt, where it is sewn to the shoulder belt, is located generally inboard of, behind and below the seat. The lap belt retractor pulls the lap belt from the inboard attachment point across the passenger's lap to restrain the lower portion of his body.

For a better understanding of the invention reference may be made to the following description of exemplary embodiments, taken in conjunction with the figures of the accompanying drawings.

DESCRIPTION OF THE DRAWINGS

FIG. 5 is a side elevational view of a belt transfer device having a motor-driven gear which drives a racked wire; and FIG. 6 is a view similar to FIG. 1 of another embodiment of the invention which includes a lap belt, the embodiment otherwise being essentially identical to that of FIG. 1.

DESCRIPTION OF THE PREFERRED EMBODIMENTS

Figure 1:
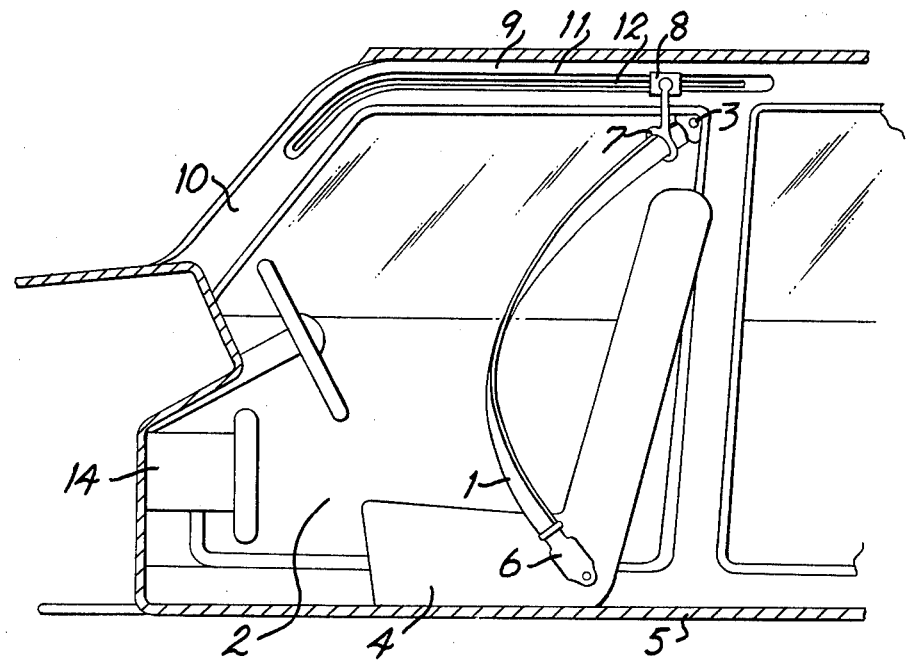
FIG. 1 is a side view in cross-section taken generally along the center of the vehicle and looking out toward the driver's side of a righthand drive vehicle having a restraint system embodying the present invention.

The vehicle occupant safety restraint system illustrated in FIG. 1 comprises a shoulder belt 1, the outboard end of which is secured to an anchor 3 that is affixed to the upper rear corner of the vehicle door 2.

The belt 1 leads from the anchor 3 downwardly and inwardly across the vehicle seat 4 to an emergency locking retractor 6 which is affixed near the lower rear inboard portion of the seat—it may also, of course, be affixed to the vehicle floor 5—rearwardly, below and behind the occupant position on the seat. The retractor is preferably of the type in which the belt is always under tension but can be pulled out to allow the occupant to shift position. In the event of a collision or some other cause for an abrupt change in the velocity of the vehicle, the retractor automatically locks so that the belt cannot pull out and the passenger is thereby restrained. Retractors of the aforementioned type are well known per se and need not be described or shown in detail.

Figure 2:
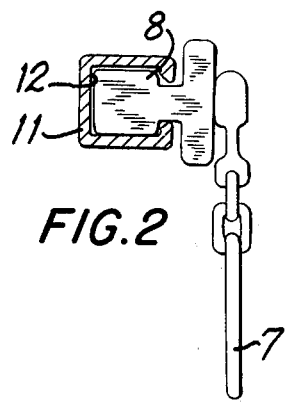
FIG. 2 is an end cross-sectional view through the guide rail looking rearwardly toward the slider and guide ring of the FIG. 1 system.
Figure 3:
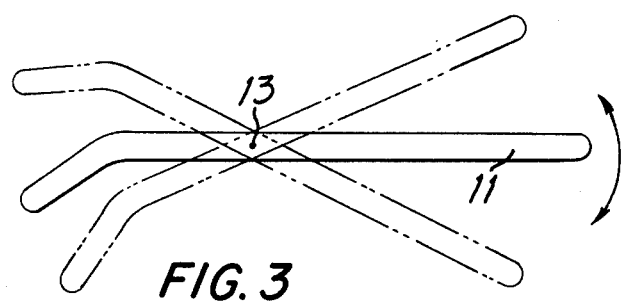
FIG. 3 is a side elevational view showing a guide rail mounted to rock in generally a vertical plane about a central axis.

The intermediate portion of the shoulder belt 1 passes freely through a guide ring 7 which is movably connected to a slider 8. For example, as shown in FIG. 2, universal movement of the ring 7, with respect to the slider, is afforded by a pair of links similar to the links of a chain. However, attachment of the ring to the slider can also be by means of ball joint, a cable, a belt, or any other suitable coupling.

The slider 8 is received within a tubular guide rail 11 which is mounted at the edge of the vehicle roof 9 and extends from a point partway down the front pillar 10 generally coextensively with the upper edge of the door back to a point adjacent the center pillar. In the illustrated embodiment the guide rail is generally square in cross-section, but it and the slider may be of various other shapes. For example, in the case of a guide rail of round cross-section, the slider may be cylindrical or spherical in shape. The guide rail 11 has a continuous slot which opens inwardly toward the passenger compartment of the vehicle to allow a portion of the slider 8 to protrude for reception of the coupling by which the guide ring 7 is fastened. It is advantageous for the internal surfaces 12 of the tubular guide rail along which the slider runs to be coated with a low friction polymeric material, such as polytetrafluoroethylene ("Teflon") or a polyurethane, in order to reduce friction between the slider and the guide rail and facilitate motion of the slider along the guide rail.

When the vehicle door is closed and a passenger occupies the seat 4, the retractor 6 pulls the shoulder belt 1 firmly but comfortably across the upper body of the occupant, a position for restraint upon locking of the retractor in the event of a collision or other abrupt change in the velocity of the vehicle. It is desirable in a system in accordance with FIG. 1 of the drawings to provide an energy absorbing knee bolster 14 to restrain the lower body of the occupant from sliding down and partly out from under the belt due to the "plunging" effect that often accompanies a collision.

When the vehicle door 2 is opened, the anchor 3 at the upper outboard end of the shoulder belt 1 swings outwardly and forwardly relative to the vehicle body. The tension applied to the belt 1 by the retractor 6 tends to hold the belt in a configuration in which the belt extends along the shortest possible path between the anchor and the retractor. As the upper rear corner of the door moves forward the tension in the belt tends to pull the guide ring 7 forward, the pivotal motion allowed by the linkage between the slider 8 and the belt guide ring 7 providing a favorable condition for the exertion of a force on the slider tending to pull it forward to maintain the belt in a plane which includes a straight line connecting the retractor 6 and the anchor 3. Accordingly, the portion of the belt lying vertically above the seat 4 is moved forward out of engagement with the upper body of the occupant. Meanwhile, however, the movable guide ring 7 keeps the part of the belt which is engaged by the guide ring 7 at a location adjacent the upper edge of the door. In other words, the guide ring 7 keeps the belt portion generally above the seat from being pulled down closer to the vehicle occupant. The shoulder belt is, therefore, maintained in a position which facilitates departure of the occupant. Similarly, if the door is opened to permit an occupant to get into the vehicle, the belt is in a favorable release configuration above and outwardly of the seat for easy entry of the occupant with a minimum of obstruction by the belt 1.

When the door 2 is reclosed the anchor 3 moves back to the position illustrated in FIG. 1 generally outboard of and behind the outboard shoulder of the occupant. The tension applied to the belt 1 by the retractor 6 pulls the guide ring 7 and the slider 8 back to the position adjacent the retractor shown in FIG. 1 in which the belt fits snugly but comfortably to the occupant's upper body and is positioned to restrain the occupant upon locking of the retractor in the event of an abrupt change in the velocity of the vehicle.

Although the guide rail 11 may be rigidly fastened to the vehicle roof, it is also possible to attach the guide rail 11 to the outboard edge of the roof 9 in a manner which allows it to rock in a generally vertical plane about a pivot pin 13 within a predetermined range of motion. The rocking motion of the rail in the course of opening and closing motions of the door smooths the sliding of the slider within the guide rail 11, in that when the door begins to open, the slider tends to remain in the rearward position in the rail until the door is partway open, and then once the angle in the belt produces a force component parallel to the rail sufficient to begin movement of the slider, it is pulled smoothly forward and passes the pivot point, whereafter it tends to move more readily along the then downwardly inclined forward portion of the rail. That same sort of motion occurs when the door is reclosed.

Figure 4:
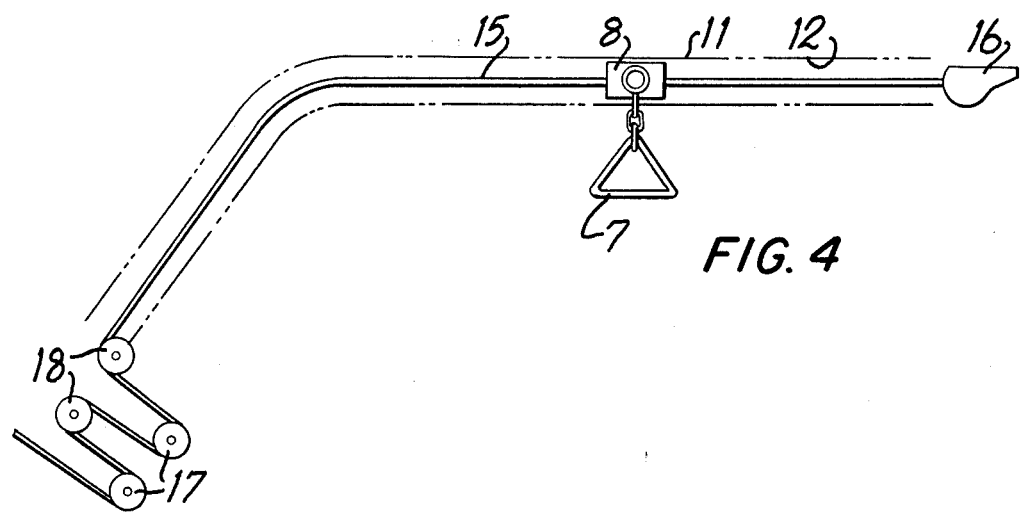
FIG. 4 is a side elevational view of a belt transfer device using a mechanical motion amplifier.

Rather than relying on the winding force of the retractor and the tension applied thereby to the belt to cause the slider to move along the rail, the slider 8 may be driven by suitable means forward and backward along the rail in response to opening and closing motions of the door. As shown in FIG. 4, one form of drive means comprises a wire 15 to which the slider 8 is secured at an intermediate point. The wire leads rearwardly along the guide rail 11 to a wire take-up reel 16 located at the rear end of the rail which resiliently winds in the wire and thereby moves the slider 8 rearwardly along the rail. The front part of the wire 15 leads forwardly and then downwardly along the guide rail 11 to a block and tackle system which comprises two movable pulleys 17 mounted within the door so that they move with the door when it is opened and closed and a pair of fixed pulleys 18 which are mounted on the vehicle body and remain stationary relative to the movable pulleys 17 when the door is opened and closed. The wire is looped in the manner shown around the pulley system, and the free end is suitably anchored to the vehicle body adjacent to the front of the door. When the door is opened, the motion of the movable pulleys 17 increases the distance between them and the fixed pulleys. The distance of movement of the portions of the door where the pulleys 17 are mounted relative to the fixed pulleys 18 is multiplied by fourfold by the block and tackle system, which is a form of mechanical motion amplifier. Accordingly, a relatively small movement of the door produces a substantially greater movement of the slider. The number of pulleys may be increased or decreased in accordance with the desired range of motion of the slider along the rail.

When the door is opened the distance between the movable pulleys and fixed pulleys increases, and that distance is multiplied in the block and tackle and transmitted to the slider and belt guide 7 which move forwardly along the rail 11 a substantial distance to a point near or along the front pillar. The forward movement of the guide ring 7 moves the part of the belt which passes through the ring forwardly away from the occupant, thereby positioning the belt so that it is convenient for the passenger to enter or leave the vehicle seat. The guide ring also holds the belt up and keeps it clear of an occupant. When the door is again reclosed, the movable pulleys 17 move back toward the fixed pulleys 18, while the take-up reel 16 pulls the wire and slider rearwardly back to the restraint position illustrated in FIG. 1 of the drawings.

Another form of drive means for the slider 8, as shown in FIG. 5, employs a racked wire 19, a fairly stiff but bendable wire having a spiral wound wire affixed around it to provide a rack gear. One end of the racked wire is fastened to the slider and the other end portion—which can not only be the forward end as shown in FIG. 5 but can also be a rearward end extending rearwardly from the slider is guided to and through a drive which comprised a gear 20 driven by an electric motor with suitable backup rolls or other guides to maintain meshing engagement between the teeth on the gear and rack teeth on the wire. The motor is reversible and is energized by closing a door-actuated switch to drive the gear in one direction when the door is opened to move the racked wire 19 forward and pull the slider forwardly with it to a stop position established by a limit switch in series with the door switch installed in the guide rail and actuated by the slider 8 when it reaches the desired stop position. When the door is reclosed, another door switch is closed to energize the motor and drive the wire in the opposite direction, thereby moving the slider 8 rearwardly to a stop position established by a second limit switch in series with the door switch, installed in the guide rail and actuated by the slider 8. Among other possible drive systems for the slider 8, there may be used a pulley wound with the racked wire 19 (especially push-pull type wire preferable) around the pulley, which can be driven in necessary direction selectively by a both rotationable electrical motor in response to opening and closing motions of the door.

The present invention is well suited for use with both a lap belt and a shoulder belt, as illustrated by the embodiment shown in FIG. 6. This embodiment is substantially identical to that of FIG. 1 except for the addition of a lap belt 21 which leads across the seat from an emergency locking retractor 22 that is affixed to the lower rear corner of the door. The inboard end of the lap belt 21 is stitched to an intermediate part of the shoulder belt by stitching 23, the connection point being located such that when the shoulder belt is in a restraining position engaging the upper body of the occupant, the connection point (at stitching 23) of the lap belt is located close to the inboard retractor associated with the shoulder belt. Meanwhile, the lap belt retractor 22 holds the lap belt in firm but comfortable engagement across the lap of the vehicle occupant whenever the door is closed and (of course) an occupant is in the seat.

When the door is opened, the lap belt moves forward and is held up by the guide ring 7 in the manner described above in connection with FIG. 1. At the same time the outward and forward movement of the lap belt retractor 22 with the lower rear corner of the door moves the lap belt forward. The attachment point of the lap belt 21 is pulled diagonally upwardly, forwardly, and outwardly by the shoulder belt as it is pulled out by the anchor 3, thereby positioning the lap belt in a release configuration forwardly of and above the seat for unobstructed entry or departure of an occupant.

Thus, there is provided in accordance with the invention an improved passive vehicle occupant restraint system which makes use of opening and closing motions of the door to move a shoulder belt, and if desired a lap belt as well, between a restraint configuration and a release configuration, the latter leaving unobstructed space for easy entry and departure of an occupant by shifting the belts to positions where they present a minimum of interference with an occupant who desires to enter or leave the vehicle. The invention provides such advantageous features with a relatively uncomplicated system which operates reliably over a long service life and which can be manufactured and installed at comparatively low cost.

The above-described embodiments of the invention are merely exemplary, and those skilled in the art will be able to make numerous variations and modifications of them without departing from the spirit and scope of the invention. All such variations and modifications are intended to be included within the scope of the invention as defined in the appended claims.

I claim:

1. A vehicle occupant restraint system for restraining an occupant of a seat located adjacent a door that is hinged along the front edge comprising a shoulder belt having an outboard end secured to an anchor affixed to the upper rear portion of the door, an intermediate portion extending down and in across the seat to the inboard rear portion of the seat and an inboard end portion wound onto an emergency locking retractor; an elongated guide rail mounted on the edge of the roof to rock within a predetermined range in a generally vertical plane about generally its center of gravity and extending generally coextensively with the upper edge of the door; a slider received by the guide rail for sliding movement therealong; and a belt guide ring movably attached to the slider and receiving the intermediate portion of the belt for movement therethrough.

2. A vehicle occupant restraint system according to claim 1 wherein the guide rail is tubular and includes a slide surface within it along which the slider is slidable and wherein the slide surface of the guide rail is coated with a low friction polymeric material.

3. A vehicle occupant restraint system according to claim 1 and further comprising a drive wire to which the slider is affixed at an intermediate location, one end of the wire being wound on to a take-up reel and the other end being coupled to a mechanical motion amplifier which is responsive to opening motion of the door to move the wire and pull the slider forward along the guide rail and responsive to closing of the door to permit the take-up reel to rewind the wire and move the slider rearwardly.

4. A vehicle occupant restraint system according to claim 3 wherein the mechanical motion amplifier is a block and tackle which includes at least one block mounted on the door, one block mounted on the vehicle body, and a wire trained partway around each such block such that the motion of the door is amplified by a factor of at least two.

5. A vehicle occupant restraint system according to claim 1, and further comprising a drive wire to which the slider is affixed, a portion of the wire being guided along the guide rail and at least a portion of the wire having a rack gear, and a motor-driven gear which is actuated in response to opening and closing of the door and meshes with the rack gear portion of the drive wire to move the slider forward when the door is opened and move the slider rearward when the door is closed.

6. A vehicle occupant restraint system according to claim 1, and further comprising a drive wire to which the slider is affixed, and drive means coupled to the wire and responsive to opening and closing motions of the door for moving the wire in a direction to move the slider forward along the guide rail when the door is opened and move the slider rearwardly along the rail when the door is closed.

7. A vehicle occupant restraint system according to any of claims 1, 2, 5 or 6, and further comprising a waist belt having an inboard end secured to the intermediate portion of the shoulder belt at a location such that when the shoulder belt and lap belt are in restraining positions engaging the occupant, the inboard end of the waist belt is located adjacent the inboard rearward portion of the seat, and the lap belt further having an outboard end portion wound on to an emergency locking retractor affixed to the lower rear portion of the door.

* * * * *